United States Patent
Ponzini et al.

(10) Patent No.: US 9,894,713 B2
(45) Date of Patent: Feb. 13, 2018

(54) METHOD OF CONTROLLING A BASE STATION SYSTEM

(71) Applicant: Telefonaktiebolaget L M Ericsson (publ), Stockholm (SE)

(72) Inventors: Filippo Ponzini, Pisa (IT); Giulio Bottari, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 20 days.

(21) Appl. No.: 14/907,607

(22) PCT Filed: Aug. 7, 2013

(86) PCT No.: PCT/EP2013/066567
§ 371 (c)(1),
(2) Date: Jan. 26, 2016

(87) PCT Pub. No.: WO2015/018444
PCT Pub. Date: Feb. 12, 2015

(65) Prior Publication Data
US 2016/0165662 A1   Jun. 9, 2016

(51) Int. Cl.
*H04W 88/08* (2009.01)
*H04W 24/02* (2009.01)

(52) U.S. Cl.
CPC ......... *H04W 88/085* (2013.01); *H04W 24/02* (2013.01)

(58) Field of Classification Search
None
See application file for complete search history.

(56) References Cited

U.S. PATENT DOCUMENTS

| | | | |
|---|---|---|---|
| 6,792,274 B1 * | 9/2004 | Kapanen | H04W 88/08 370/329 |
| 9,008,162 B2 * | 4/2015 | Kennard | H04B 7/0613 375/219 |
| 9,462,603 B2 * | 10/2016 | Kummetz | H04L 1/00 |

(Continued)

FOREIGN PATENT DOCUMENTS

| EP | 0 685 973 A2 | 12/1995 |
|---|---|---|
| WO | WO 2012/087206 A1 | 6/2012 |

OTHER PUBLICATIONS

IMT-Advanced and Next-Generation Mobile Networks; "Coordinated Multipoint: Concepts, Performance, and Field Trial Results" by Ralf Irmer et al, Feb. 2011.

(Continued)

*Primary Examiner* — Bunjob Jaroenchonwanit
(74) *Attorney, Agent, or Firm* — Baker Botts LLP

(57) ABSTRACT

A method of controlling a base station system is provided. The method comprises generating and transmitting a control signal arranged to cause a radio equipment controller to control a first radio equipment from a plurality of radio equipment at a first time; and generating and transmitting a control signal arranged to cause the radio equipment controller to control a second radio equipment from the plurality of radio equipment instead of the first radio equipment at a later time; wherein each of the plurality of radio equipment is coupled to a respective antenna having a respective coverage area. Also provided is a controller and a computer program product configured to control a base station system.

20 Claims, 7 Drawing Sheets

(56) References Cited

U.S. PATENT DOCUMENTS

| | | | | |
|---|---|---|---|---|
| 2006/0014548 A1* | 1/2006 | Bolin | ............ | H04W 64/00 455/456.1 |
| 2007/0004415 A1* | 1/2007 | Abedi | ............ | H04W 36/18 455/442 |
| 2008/0162981 A1* | 7/2008 | Jajoo | ............ | G06F 11/202 714/2 |
| 2008/0256277 A1* | 10/2008 | Sato | ............ | G06F 12/084 710/110 |
| 2008/0298336 A1* | 12/2008 | Gollamudi | ............ | H04B 7/022 370/343 |
| 2009/0252108 A1* | 10/2009 | Watanabe | ............ | H04W 28/065 370/329 |
| 2010/0062755 A1* | 3/2010 | Quilty | ............ | H04W 24/02 455/418 |
| 2010/0130203 A1* | 5/2010 | Fallon | ............ | H04W 92/045 455/435.1 |
| 2010/0151920 A1* | 6/2010 | Song | ............ | H04W 52/0216 455/574 |
| 2012/0014257 A1* | 1/2012 | Ahluwalia | ............ | H04W 48/12 370/241 |
| 2012/0057503 A1* | 3/2012 | Ding | ............ | H04W 24/04 370/254 |
| 2012/0100854 A1* | 4/2012 | Hanaoka | ............ | H04W 72/0453 455/436 |
| 2013/0237201 A1* | 9/2013 | Futaki | ............ | H04W 24/02 455/418 |
| 2015/0017939 A1* | 1/2015 | Waters | ............ | H04B 17/24 455/226.1 |
| 2015/0350931 A1* | 12/2015 | Dillinger | ............ | H04W 72/0486 370/329 |
| 2016/0249284 A1* | 8/2016 | Park | ............ | H04W 48/16 |

OTHER PUBLICATIONS

CPRI Specification V1.0; Interface Specification; Common Public Radio Interface (CPRI); Interface Specification, Sep. 30, 2003.
International Search Report for International Application No. PCT/EP2013/066567, dated May 28, 2014.

* cited by examiner

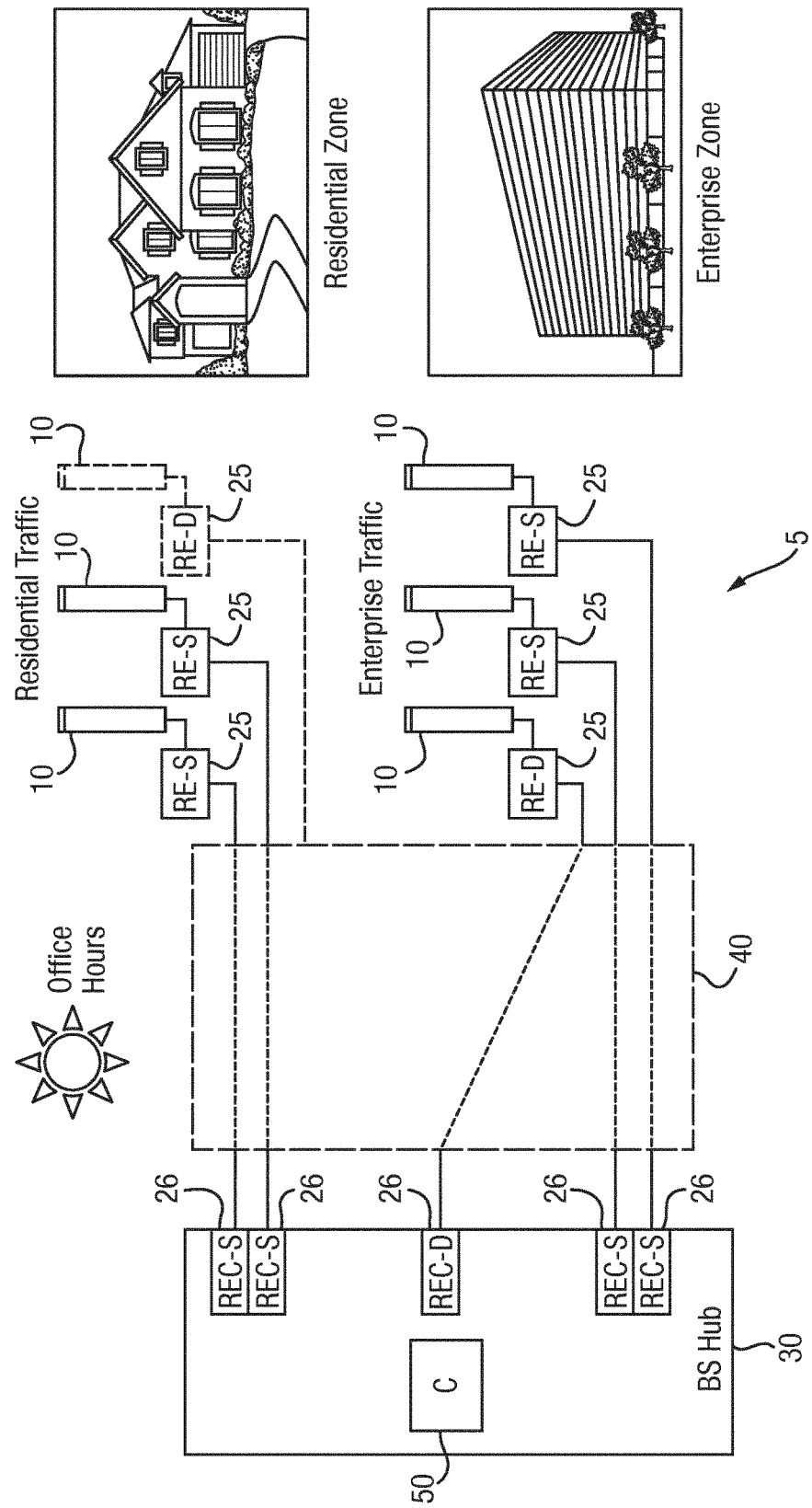

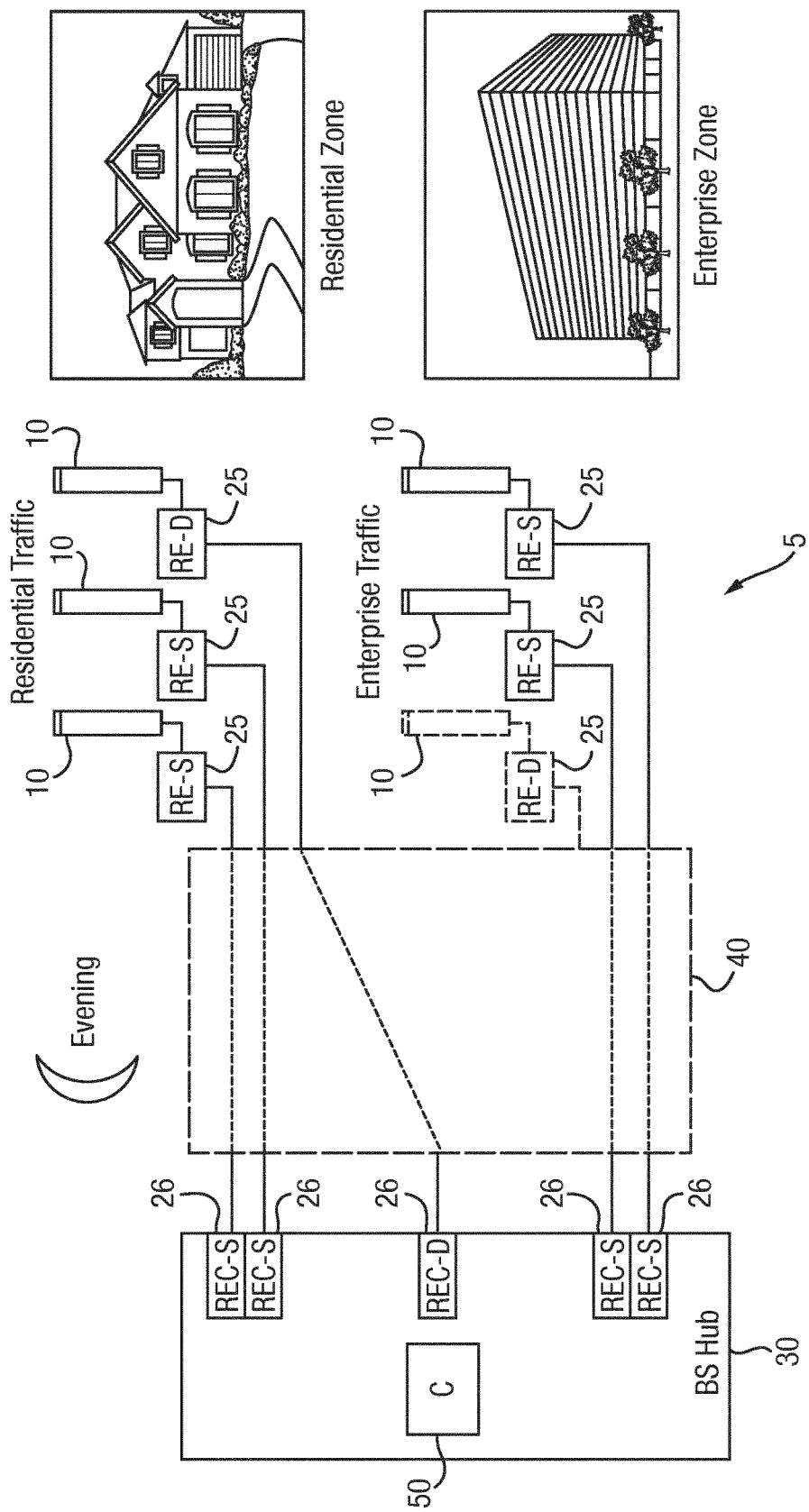

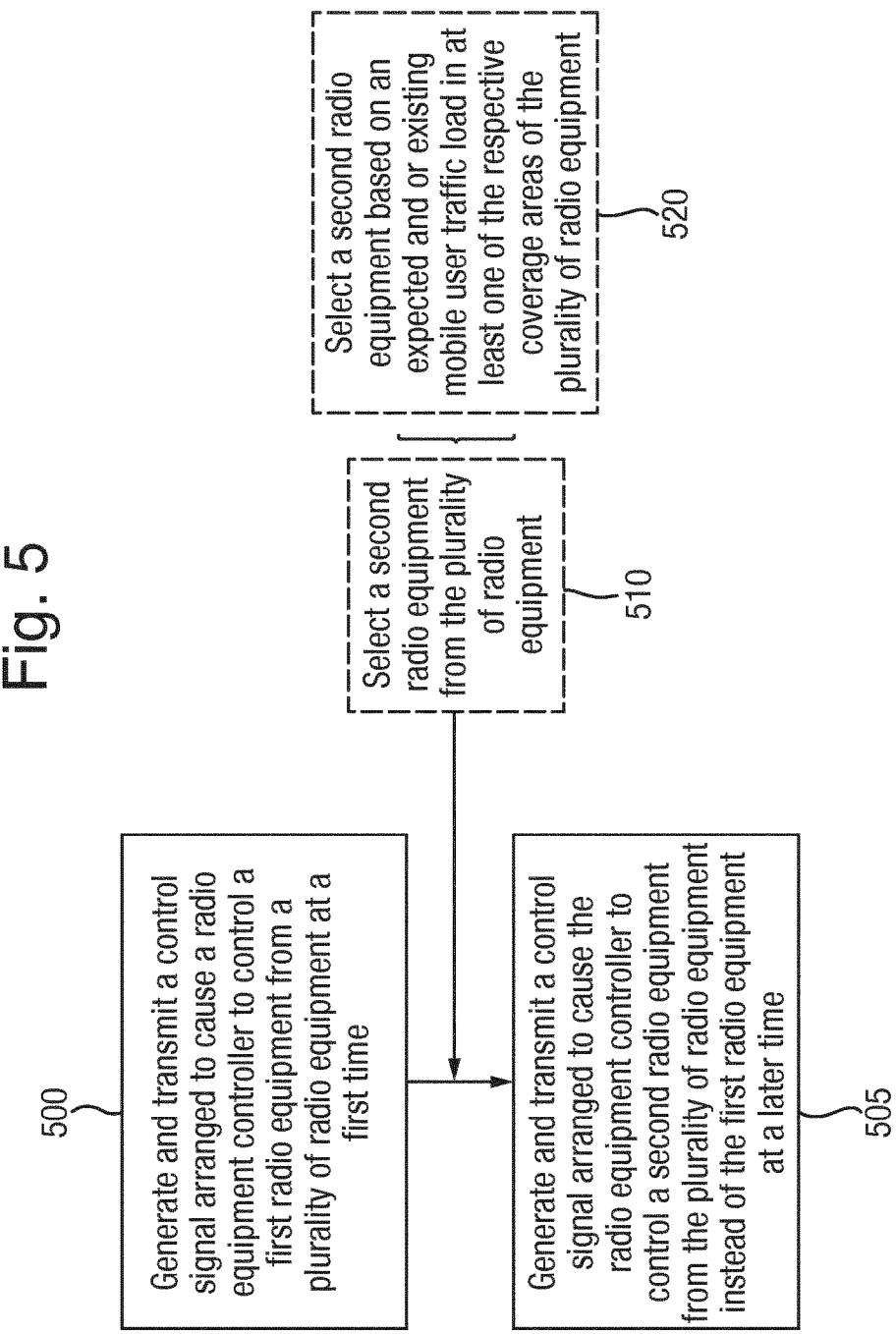

Select a second radio equipment based on an indication of expected mobile user traffic load in at least one of the respective coverage areas
600

Receive an indication of existing mobile user traffic load in at least one of the respective coverage areas
610

Select a second radio equipment based on the indication
620

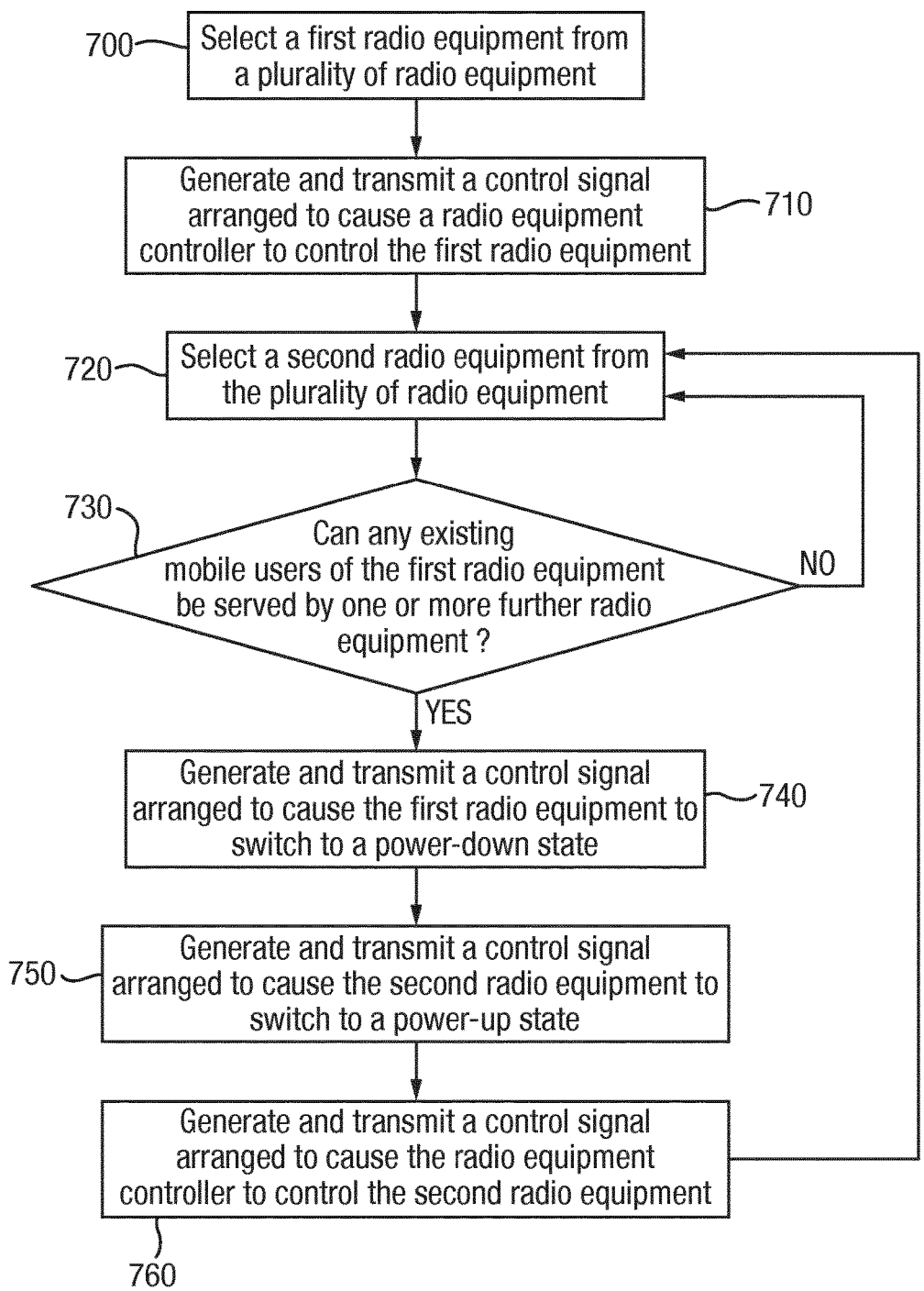

METHOD OF CONTROLLING A BASE STATION SYSTEM

PRIORITY

This nonprovisional application is a U.S. National Stage Filing under 35 U.S.C. § 371 of International Patent Application Serial No. PCT/EP2013/066567, filed Aug. 7, 2013, and entitled "A Method of Controlling a Base Station System."

TECHNICAL FIELD

The present invention relates to a method of controlling a base station system, a controller, a base station system including a controller, and a radio access network including a base station system. The present invention also relates to a computer program product for performing, when run on a computer, a method of controlling a base station system.

BACKGROUND

FIG. 1 illustrates a conventional base station arrangement for a plurality of antenna sites 10. A base station 20 is provided at each antenna site 10. Each base station 20 comprises radio equipment 25 and a radio equipment controller 26. Typically, the radio equipment controllers 26 perform baseband signal generation and/or processing and the radio equipment 25 perform analogue and radio frequency functions such as filtering, modulation, frequency conversion and amplification.

A problem with this arrangement however is that it is difficult to establish X2 connections between adjacent base stations 20. X2 connections are logical or even physical connections which enable power and traffic information to be correlated between adjacent base stations 20, reducing interference and increasing data throughput (bit spectral efficiency).

More recently, a centralised base station system as illustrated in FIG. 2 has become popular. Instead of locating both the radio equipment 25 and the radio equipment controllers 26 at the respective antenna sites 10, only the radio equipment 25 is located at the antenna sites 10. The radio equipment controllers 26 are located remote from the antenna sites 10 at a common site, which is sometimes referred to as a base station hub or baseband hotel 30. The base station hub 30 is connected to each of the radio equipment 25 by a transport infrastructure 40 which may support the communication of, for example, common public radio interface (CPRI) signals between the radio equipment controller 26/radio equipment 25 pairs. The base station hub 30 further has a network interface (not shown) for communication with a core network to transmit and receive mobile traffic.

This arrangement has the advantage that the exchange of information between base stations 20 (X2 connections) is more straightforward. Furthermore, the base station hub 30 may be located in a convenient, low cost location, for example in the basement of a building or an out of town industrial site, which may make it easier to secure the radio equipment controllers 26 and to access the radio equipment controllers 26 to perform maintenance.

SUMMARY

The applicant has appreciated however that it would be desirable to provide an improved base station system.

According to the present invention, there is provided a method of controlling a base station system. The method comprises: generating and transmitting a control signal arranged to cause a radio equipment controller to control a first radio equipment from a plurality of radio equipment at a first time. The method further comprises generating and transmitting a control signal arranged to cause the radio equipment controller to control a second radio equipment from the plurality of radio equipment instead of the first radio equipment at a later time. Each of the plurality of radio equipment is coupled to a respective antenna having a respective coverage area.

Embodiments of the present invention have the advantage that, since the radio equipment which is controlled by the radio equipment controller can be changed dynamically, the number of radio equipment controllers required by the base station system can be reduced, whilst at the same time the mobile user experience can be improved in comparison to if the base station system simply included fewer antennas/radio equipment. Thus, advantageously, the hardware resources required by the base station system, and therefore the power consumed by and the cost of the base station system, can be shared and reduced. In addition, if a transport network connects the radio equipment controller to the plurality of radio equipment, more efficient use of the transport network may be made.

The method may comprise selecting the second radio equipment from the plurality of radio equipment.

In preferred embodiments, this step may comprise selecting the second radio equipment from the plurality of radio equipment based on expected and/or existing mobile user traffic load in at least one of (and optionally each of) the respective coverage areas. This enables, as will be described in more detail below, the radio equipment to be controlled whose operation may most greatly improve the mobile user experience.

The step of selecting the second radio equipment from the plurality of radio equipment may comprise selecting the second radio equipment from the plurality of radio equipment based on an indication of expected mobile user traffic load in at least one or the respective coverage areas.

In addition or alternatively, the step of selecting the second radio equipment from the plurality of radio equipment may comprise receiving an indication of existing mobile user traffic load in at least one of the respective coverage areas, and selecting the second radio equipment from the plurality of radio equipment based on the indication.

In preferred embodiments, the step of generating and transmitting a control signal arranged to cause the radio equipment controller to control a second radio equipment from the plurality of radio equipment instead of the first radio equipment may further comprise: generating and transmitting a control signal arranged to cause the first radio equipment to switch to a power-down state. This has the advantage that power can be saved whilst the first radio equipment is not operational.

In further preferred embodiments, a second radio equipment controller may be configured to control one or more further radio equipment associated with one or more antennas having a combined coverage area overlapping the coverage area of the antenna associated with the first radio equipment. And the method may further comprise: determining whether the one or more further radio equipment are able to serve existing mobile users of the first radio equipment and, if so, generating and transmitting the control signal arranged to cause the radio equipment controller to control the second radio equipment instead of the first radio equipment. The step of determining whether the one or more further radio equipment are able to serve existing mobile users of the first radio equipment may comprise: determining whether the one or more further radio equipment are able to meet a quality of service (such as a minimum bandwidth requirement) associated with each of the existing mobile users of the first radio equipment. These steps have the advantage that a switch to control the second radio equipment instead of the first radio equipment may only be made, if it is determined that all currently connected mobile users of the first radio equipment will not be disconnected (or preferably that they can still be served within agreed quality of service levels).

There is further provided a computer program product which, when run on a computer, performs the method as described above. The computer program product could be, for example, in the form of a signal such as a downloadable data signal, or it could be in any other form. It may for example be stored on a computer readable medium.

There is also provided a controller. The controller comprises a control unit configured to generate and transmit a control signal arranged to cause a radio equipment controller to control a first radio equipment from a plurality of radio equipment at a first time, and to generate and transmit a control signal arranged to cause the radio equipment controller to control a second radio equipment from the plurality of radio equipment instead of the first radio equipment at a later time. Each of the plurality of radio equipment is associated with a respective antenna having a respective coverage area. The control unit may for example comprise a processor, and may be implemented in hardware or software of any combination thereof.

The control unit may be further configured to generate and transmit a control signal arranged to cause the first radio equipment to switch to a power-down state.

The control unit may further comprise a selecting unit configured to select the second radio equipment from the plurality of radio equipment, which may select the second radio equipment from the plurality of radio equipment based on expected and/or existing mobile user traffic load in at least one of the respective coverage areas.

Further, the controller may comprise a processing unit configured to determine whether one or more further radio equipment are able to serve existing mobile users of the first radio equipment and, if so, to cause the control unit to generate and transmit a control signal arranged to cause the radio equipment controller to control the second radio equipment instead of the first radio equipment.

There is also provided a base station system comprising: a plurality of radio equipment, wherein each of the plurality of radio equipment is coupled to a respective antenna having a respective coverage area; a radio equipment controller; and a controller as described above.

In preferred embodiments, the radio equipment controller is connected to each of the plurality of radio equipment by a wavelength-switched optical network. This is advantageous since optical technologies ensure large bandwidth availability with switching times compatible with the proposed method. However, the radio equipment controller may instead be connected to each of the plurality of radio equipment by any communication means.

There is also provided a radio access network comprising a base station system as described above.

DESCRIPTION OF THE DRAWINGS

Embodiments of the invention will now be described by way of example only and with reference to the accompanying drawings, in which:

FIG. 3 illustrates a base station system according to an embodiment of the present invention in a first state;

FIG. 4 illustrates the base station system of FIG. 3 in a second state;

FIG. 5 is a flow chart of steps according to an embodiment of the present invention;

FIG. 7 is a flow chart of steps for controlling the base station system according to a preferred embodiment of the present invention;

DETAILED DESCRIPTION

Figure 1:
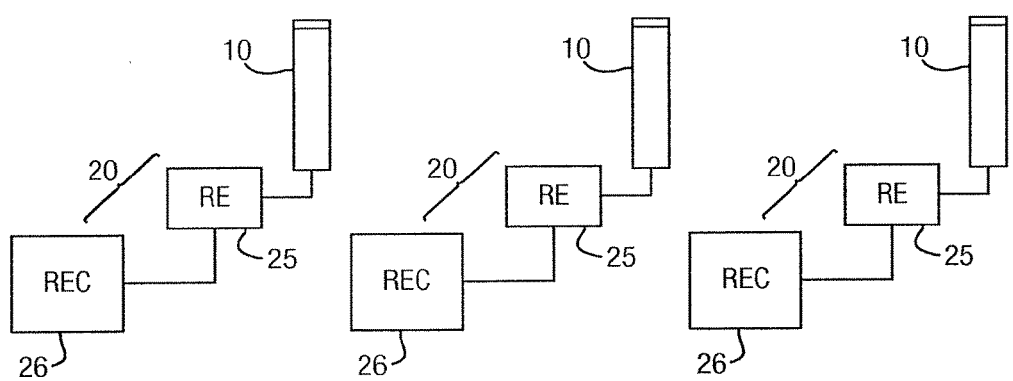
FIG. 1 is a schematic diagram of a prior art base station arrangement.
Figure 2:
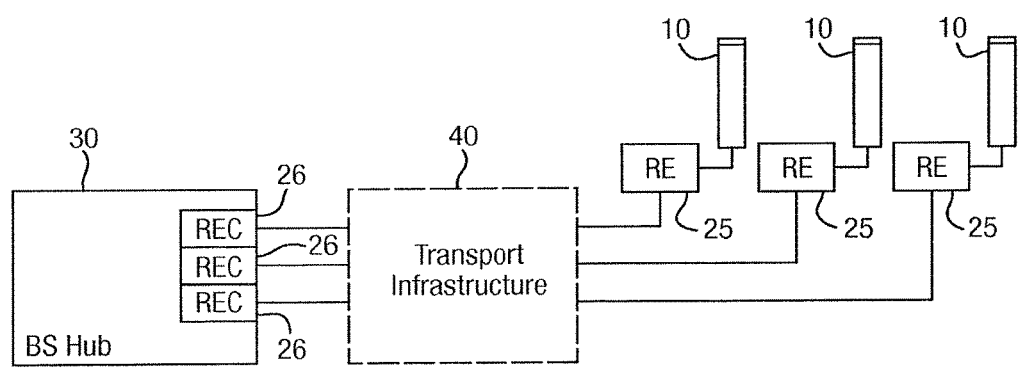
FIG. 2 is a schematic diagram of another prior art base station arrangement.

FIG. 3 is a schematic view of a base station system 5 according to a preferred embodiment of the present invention. In this example, there are two groups or pools of antennas 10 located in respective regional zones. In this example, three antennas 10 are located in each zone. However, it will be appreciated that there may be more or fewer antennas 10 in each zone.

Each of the antennas 10 is configured to transmit and receive mobile traffic within a coverage area. In this example, the coverage areas of each of the antennas 10 in a zone fully overlap, whereby mobile traffic received or transmitted by one of the antennas could alternatively be handled by another of the antennas. However, in another example, the coverage areas of at least some of the antennas 10 in a zone may only partially overlap, as will be explained in more detail below.

Each of the antennas 10 has respective radio equipment (RE), also referred to as a radio unit, 25 coupled thereto, which may for example be radio equipment as defined in CPRI specifications. The respective radio equipment 25 is located proximate its antenna 25.

The radio equipment 25, in both of the zones, is connected to a base station hub 30, by transport network 40.

The base station hub 30 includes a plurality of radio equipment (or unit) controllers 26. Again, these may be radio equipment controllers as defined in CPRI specifications.

However, instead of comprising a radio equipment controller 26 for each antenna/radio equipment 25, and therefore six radio equipment controllers 26, there are only five radio equipment controllers 26. Two of the radio equipment 25 in each zone, labelled RE-S, have a respective radio equipment controller 26, REC-S. These radio equipment controllers 26 are always associated with their respective radio equipment 25, as indicated by the dotted lines through the transport network 40 between those radio equipment controllers 26 and their radio equipment 25. The other radio equipment 25 in each zone, labelled RE-D, shares a single radio equipment controller 26, REC-D. Thus, this radio equipment controller 26 may be associated with either the radio equipment, RE-D 25, in the first zone or the radio equipment, RE-D 25, in the second zone at any one time.

It should be appreciated however that, in other examples, where there are more than two regional zones, the radio equipment controller REC-D 26 may be shared between more than two radio equipment 25. In this case, radio equipment controller REC-D 26 may control any one of the plurality of radio equipment in the respective regional zones at any time. This may lead to increased savings, although may increase the complexity of switching between the radio equipment. Furthermore, it is possible that the base station hub 30 comprises more than one radio equipment controller 26 which can be dynamically shared between a plurality of radio equipment 25 in respective regional zones or areas.

In this embodiment, the base station system 5 further comprises a controller 50 which is configured to select one of the radio equipment RE-D 25 and cause the radio equipment controller REC-D 26 to control that radio equipment 25 RE-D.

FIG. 5 is a flow chart illustrating steps of controlling a base station system according to an embodiment of the present invention. At step 500, a control signal is generated and transmitted which is arranged to cause a radio equipment controller to control a first radio equipment from a plurality of radio equipment at a first time, wherein each of the plurality of radio equipment is coupled to a respective antenna having a respective coverage area. At step 505, a control signal is generated and transmitted which is arranged to cause a radio equipment controller to control a second radio equipment from the plurality of radio equipment instead of the first radio equipment at a later time. As indicated, at 510, the first and/or second radio equipment may be selected from the plurality of radio equipment, and, as indicated at 520, the first and/or second radio equipment may be selected based on expected and/or existing mobile user traffic load in at least one of the respective coverage areas of the plurality of radio equipment.

In many embodiments, the selection may be based on expected and/or existing mobile user traffic load in each of the respective coverage areas of the plurality of radio equipment 25 RE-D. This enables the radio equipment 25 RE-D whose coverage area has the greatest mobile user traffic load, and therefore which may most benefit from an increase in bandwidth for mobile traffic, to be selected. However, in an alternative embodiment, it is possible that a zone is given preference, such that if the traffic load in that zone is determined to be or is expected to be above a predetermined threshold, the radio equipment 25 in that zone may be selected, even if a different zone has more mobile traffic. Vice versa, in the above example where there are only two radio equipment 25 RE-D, if the traffic load in the zone of one of the radio equipment 25 RE-D falls below or is expected to fall below a predetermined threshold, the other radio equipment 25 RE-D may be selected, even if that zone has less traffic. Aspects such as the service level requirements of mobile users in the respective zones areas may also be taken into account.

In this example, as indicated in FIGS. 3 and 4, the first regional zone covers a residential area, and the second regional zone covers an enterprise or commercial area such as a business park.

The inventors have appreciated that these types of areas have different traffic demands throughout the day. Typically, a commercial area has greater traffic during working hours. While, as people go home after work, the mobile traffic demand in the residential area increases, and the traffic demand in the commercial area decreases.

However, this is only one example, and of course other types of region may experience increases or spikes in traffic demand over a period of time. For example, a region encompassing a football stadium will have significantly increased traffic demand during, and before and after, a football match. Similarly, a town centre will likely have an increase in mobile traffic demand during Saturday shopping hours. Changes in mobile traffic demand may also take place over a longer period of time, such as on a seasonal basis. For example, a seaside resort will likely have more mobile traffic demand during the summer season, when the population increases, than in the winter.

In this example, controller 50 controls the shared radio equipment controller 26 REC-D to control either the radio equipment 25 RE-D in the residential zone or the radio equipment 25 RE-D in the commercial zone. More particularly, as illustrated in FIG. 3, during office hours, the radio equipment controller 26 REC-D controls the radio equipment 25 RE-D in the commercial zone. This enables the mobile traffic bandwidth available to users in the commercial zone to be increased. On the other hand, as illustrated in FIG. 4, after office hours, controller 50 causes the radio equipment controller 26 REC-D to control the radio equipment 25 RE-D in the residential zone. Thus, after office hours, when traffic demand has dropped in the commercial area, the mobile traffic bandwidth available in the residential area is increased (and the mobile traffic bandwidth in the commercial area is decreased).

Thus, the user experience can be improved, in comparison to if the two radio equipment 25 RE-D and associated antennas 10 were not installed, with fewer hardware resources at the base station hub than if a dedicated radio equipment controller 25 were provided for each radio equipment 25. In addition, more efficient use of the transport network 40 may be achieved, since fewer signals are sent over the transport network 40.

Figures 6A, 6B, 8:
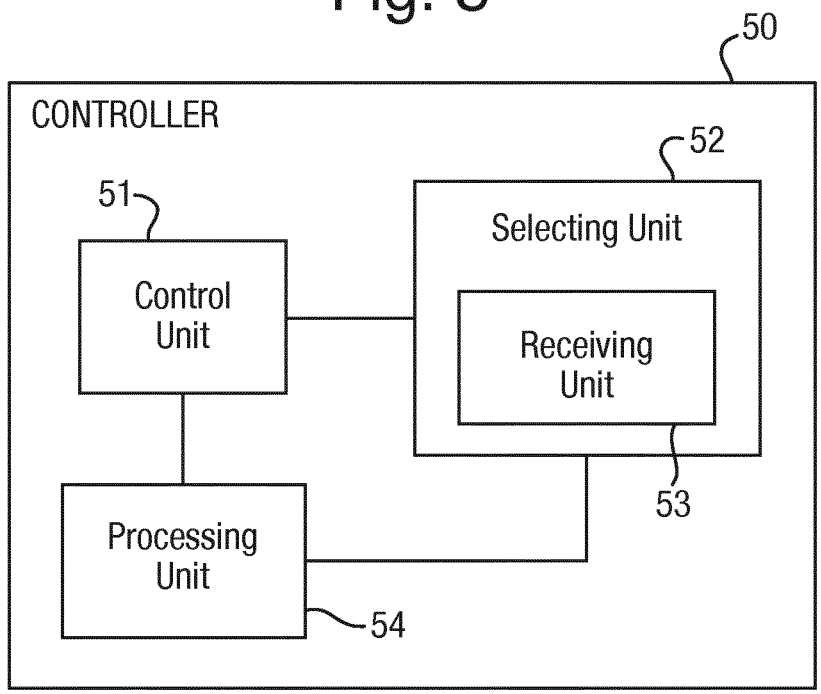
FIGS. 6a and 6b illustrate steps for selecting a radio equipment according to preferred embodiments of the present invention.
FIG. 8 is a schematic view of a controller according to an embodiment of the present invention.

The expected and/or existing mobile user traffic in the coverage areas may be determined in a number of ways. FIGS. 6*a* and 6*b* show two examples.

As explained above, since traffic fluctuations are often predictable, it is possible that a radio equipment 25 RE-D is selected based on an expectation or prediction of mobile traffic load in at least one of (optionally both of) the respective coverage areas of the radio equipment 25 RE-D. This may be more straightforward than determining the existing or current mobile user traffic load in the respective coverage areas, and given that traffic variations often follow predictable patterns as explained above this approach may produce good results. This method may involve, as shown in FIG. 6*a*, at step 600, selecting a radio equipment 25 RE-D based on an indication of expected mobile user traffic load in at least one of (preferably both of) the respective coverage areas. This indication may be pre-stored in a memory device at the controller 50. Alternatively, controller 50 may for example be preconfigured to cause a certain radio equipment 25 to be selected at different times, based on expected mobile user traffic load at those times. For example, in the above case, controller 50 could be preconfigured to select the radio equipment 25 RE-D in the commercial zone at 8 am, and then to select the radio equipment 25 RE-D in the residential zone at 5 pm.

Alternatively, or in addition, the radio equipment 25 RE-D may be selected based on an indication of current or existing traffic load in the respective coverage areas. As shown in FIG. 6*b*, this method may comprise at step 610 receiving an indication of existing mobile user traffic load in at least one of the respective coverage areas (and preferably in both of the respective coverage areas), and at step 620 selecting a radio equipment 25 RE-D based on the indication. For example, where there is a plurality of radio equipment 25 RE-D in each zone, as in this example, the mobile user traffic load on the other radio equipment 25 RE-S in the zone may be used as an indication of existing traffic load in the respective coverage area of a non-selected radio equipment 25 RE-S. This indication may be determined at for example the radio equipment controller(s) 26 REC-S controlling those radio equipment 25 RE-S, and then forwarded to controller 50, although other possibilities exist.

FIG. 7 illustrates steps of controlling a base station system according to a preferred embodiment of the present invention. At step 700, a first radio equipment is selected from a plurality of radio equipment. Then, at step 710, a control signal is generated and transmitted which is arranged to cause a radio equipment controller to control the first radio equipment. At a later time, at step 720, a second radio equipment is selected from the plurality of radio equipment which is different from the first radio equipment. Then, at step 730, preferably, it is determined whether any existing mobile users of the first radio equipment can be served by one or more different (or further) radio equipment. That is, in respect of the example of FIG. 3, if say the first radio equipment is radio equipment 25 RE-D in the commercial area, whether the other radio equipment 25 RE-S in that zone can serve any existing mobile users of the first radio equipment 25 RE-D.

In this example, as mentioned above, the coverage areas of each of the antennas 10 in a zone fully overlap, so that it should be possible for any existing users of the first radio equipment 25 RE-D to be transferred over to the other radio equipment 25 RE-S. However, preferably, this step includes determining whether the other radio equipment 25 RE-S is able to meet a quality of service associated with each of the existing mobile users, such as a minimum bandwidth requirement.

If any of the existing mobile users cannot be served by a different radio equipment (at least not within a required quality of service), then preferably a switch is not made to cause the radio equipment controller to control the second radio equipment instead of the first radio equipment, which would result in those users being disconnected (or a quality of service level not being met). Instead, at a later time, a second radio equipment may again be selected and then step 830 is repeated, until it is determined that any existing mobile users of the first radio equipment can be served by a different radio equipment.

Note that in this example, as mentioned above, each of the other antennas 10 in a zone have a coverage area completely overlapping the coverage area of the antenna 10 associated with the first radio equipment 25 RE-D. However, in other examples, only one other antenna in the zone may have a coverage area completely overlapping that of the first radio equipment. For example, one antenna in a zone, referred to as a "mother" antenna, may have a coverage area larger than that of the other antenna(s) in the zone. These other antennas, which may include the antenna associated with the first radio equipment and which may be referred to as "daughter" antennas, may have respective coverage areas which each partially but together completely cover the coverage area of the mother antenna. Thus, by operating the daughter antennas when there is an increase in traffic, these antennas may take some of the load off the mother antenna, and thereby increase the mobile traffic bandwidth available to mobile users in the zone. Further, in alternative embodiments, the coverage area of the antenna associated with the first radio equipment may only be partially overlapped by the coverage area of each of a plurality of other antennas in the zone. However, together the coverage areas of these other antennas may completely overlap the coverage area of the antenna associated with the first radio equipment, such that it is always possible (service levels permitting) for mobile users of the first radio equipment to be served by other radio equipment.

Referring again to FIG. 7, if it is determined that existing mobile users of the first radio equipment can be served by different radio equipment, then the existing mobile users are passed over to the different radio equipment, and at step 740 a control signal is preferably generated and transmitted to cause the first radio equipment to switch to an inactive or power-down state. This enables power to be saved whilst the first radio equipment is not operational. At step 750, if necessary, a control signal may also be generated to cause the second radio equipment to switch to an active or power up state. And, at step 760, a control signal is generated and transmitted to cause the radio equipment controller to control the second radio equipment. Note that steps 740, 750 and 760 may be performed in any order. This process may then be repeated if, at a later time, a further second radio equipment is selected from the plurality of radio equipment. Note that this "further" second radio equipment may be the first radio equipment or, where the plurality of radio equipment includes more than two radio equipment, a third radio equipment different from the first and second radio equipment.

FIG. 8 is a schematic view of a controller 50 showing functional units of the controller according to an embodiment of the present invention. The controller 50 comprises a control unit 51, which may for example comprise a processor, configured to generate and transmit a control signal arranged to cause a radio equipment controller to control a first radio equipment from a plurality of radio equipment at a first time, wherein each of the plurality of radio equipment is associated with a respective antenna having a respective coverage area. The control unit 51 is further configured to generate and transmit a control signal arranged to cause the radio equipment controller to control a second radio equipment from the plurality of radio equipment instead of the first radio equipment at a later time. The control unit 51 may further be configured to generate and transmit a control signal arranged to cause the first radio equipment to switch to a power-down mode. In some embodiments, controller 50 may further comprise a processing unit 54 configured to determine whether one or more further radio equipment are able to serve existing mobile users of the first radio equipment (for example whether the one or more further radio equipment are able to meet a quality of service associated with each of the existing mobile users of the first radio equipment) and, if so, to cause the control unit to generate and transmit a control signal arranged to cause the radio equipment controller to control the second radio equipment instead of the first radio equipment.

The controller 50 may further comprise a selecting unit 52 configured to select the second radio equipment from the plurality of radio equipment, for example as described above, based on existing or expected mobile traffic load in at least one of the respective coverage areas. In one embodiment, the selecting unit 52 may comprise a receiving unit 34 configured to receive an indication of existing mobile user traffic load in at least one of the respective coverage areas, and the selecting unit 52 is configured to select the second radio equipment from the plurality of radio equipment based on this indication.

The control unit 51, selecting unit 52 and processing unit 54 may each be implemented in software or hardware or any combination thereof. Note that a single processor or other unit may fulfil the function of several of the units, and each of the units may comprise one or more units integrated to any degree.

In this example, referring to FIGS. 3 and 4, controller 50 is located in the base station hub 30 and is thus proximate the radio equipment controllers 26. This is convenient since the base station hub 30 may be located in a secure location, which is easy to access. However, controller 50 may be located anywhere, provided it can communicate with the necessary network components to control which radio equipment 25 RE-D is controlled by the radio equipment controller 26 REC-D. This may include, for example, causing a new path to be set up through the transport network 40 between the radio equipment controller 26 REC-D and the selected radio equipment 25 RE-D, switching the selected radio equipment 25 RE-D to an active state in which it can transmit and receive mobile traffic and updating a control module such that the radio equipment controller 26 REC-D receives subscriber mobile data to be transmitted by the new radio equipment 25 RE-D. Note that, although in FIG. 7 controller 50 is shown as a single module located in a single location, controller 50 may alternatively comprise a plurality of distributed modules.

Transport network 40 is preferably a wavelength-switched optical network, which has the advantage that paths through the network 40 between the base station hub 30 (radio equipment controller 26 REC-D) and the respective radio equipment 25 RE-D can be set up, and torn down quickly in comparison to networks which use electronic switching. However, the transport network may use any type of technology suitable for transmitting data from the base station hub to each of the radio equipment 25 RE-D.

Figure 9:
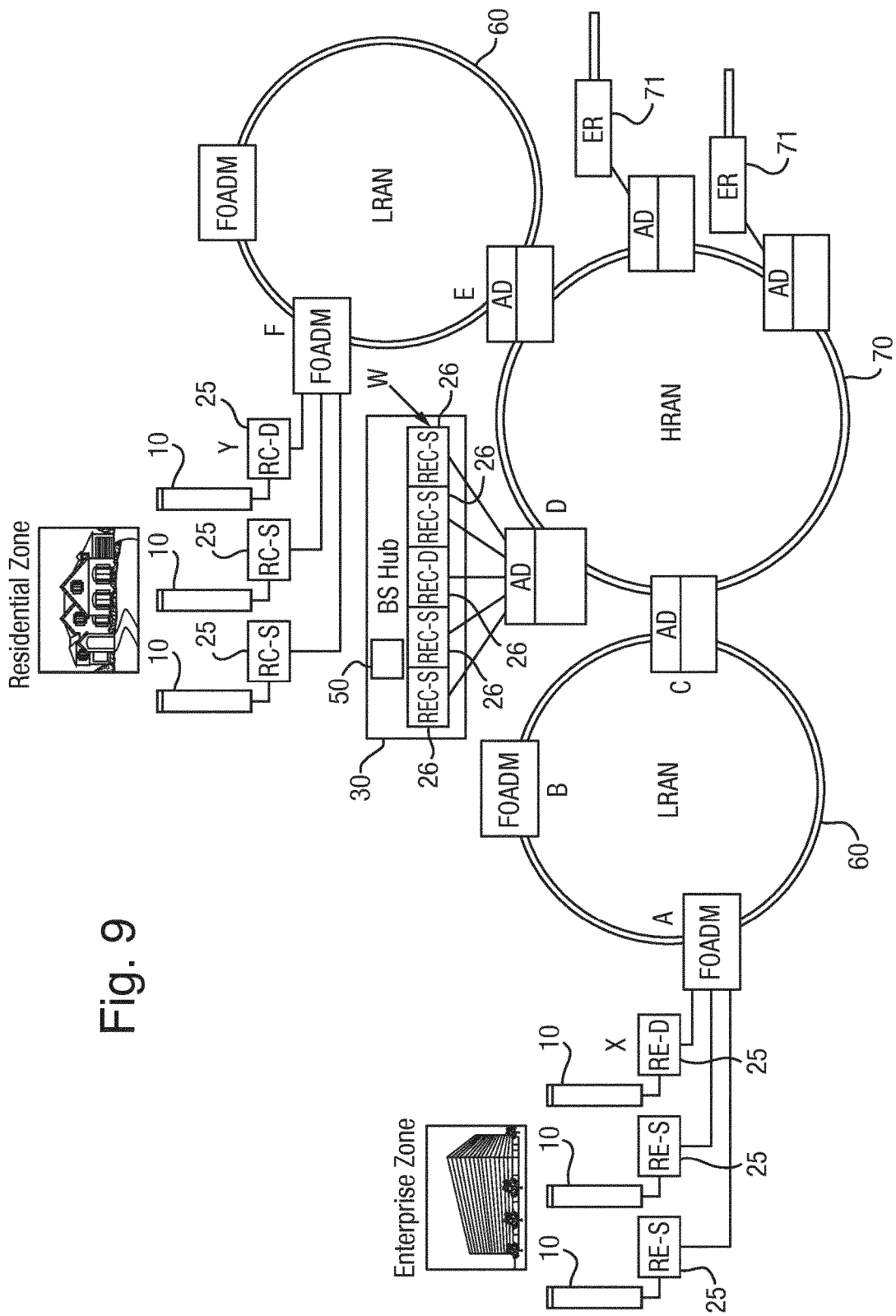
FIG. 9 illustrates a radio access network comprising a base station system according to embodiments of the present invention.

FIG. 9 is an illustration of an example implementation of a radio access network comprising a base station system embodying the present invention, wherein transport network 40 is a wavelength-switched optical network. In this example, the radio equipment 25 RE-D in each of the zones are connected to respective low radio access network (LRAN) rings 60. Both of the LRAN rings 60 are connected to a common high radio access network (HRAN) ring 70. The HRAN ring 70 is connected to a core network, via edge routers (ER) 71, and in addition to a base station hub or base band hotel 30.

A fixed optical add drop multiplexer ADM (also known as a passive ADM) is used to connect each of the radio equipment 25 in a zone to the respective LRAN ring 60, and a WDM node or reconfigurable optical add drop multiplexer (ROADM) is used to connect each LRAN ring 60 to the HRAN ring 70. Similarly, a ROADM type node is used to connect the HRAN ring 70 to the edge routers 71 and to connect the HRAN ring 70 to the base station hub 30.

In this example, as explained above, during office hours, the radio equipment, 25 RE-D, in the commercial area, labelled X, is connected to the radio equipment controller 26 REC-D, labelled W, in the base station hub 30. Signals travel between radio equipment X and radio equipment control module W along a path via nodes X-A-B-C-D-W. Similarly, signals between each of the other radio equipment, 25 RE-S, and their respective radio equipment controllers 26 RE-S travel along the same path via the same nodes but on a respective wavelength channel.

During evening hours, radio equipment X is set to a power-down state, and the hardware resources which were used to connect X and W are released. The radio equipment 25 RE-D in the residential area can now be connected to radio equipment controller 26 REC-D, W. The radio equipment 25 is connected to the base station hub 30 along the same path as the other radio equipment, 25 RE-S, in the residential area which are permanently connected to their respective radio equipment controllers 26 RE-S but again on a respective wavelength channel.

This switch may be achieved by re-routing the optical channel (i.e. a lightpath operating on a wavelength in the WDM comb) using the reconfigurable capability of the ROADMs. Note that wavelength planning is therefore required to ensure that a bandwidth slot is available before switching the traffic onto the new path, as will be understood by those skilled in the art, and preferably this new connectivity path is prepared in advance to minimise switching time.

In preferred embodiments, the radio equipment controllers 26 perform digital baseband signal generation and processing functions of received calls/data to be transmitted to mobile users or subscribers via the respective radio equipment 25/antennas 10. The resultant signals are sent across the network 40 to the respective radio equipment 25 in the form of downlink CPRI signals. The radio equipment 25 then performs analogue and radio frequency functions, such as filtering, modulation, frequency conversion and amplification, before the data is emitted by the respective antenna 10 for receipt by the desired mobile subscriber. Vice versa, uplink CPRI signals carry mobile subscriber traffic received by antenna 10 and processed by the associated radio equipment 25 through network 40 to the associated radio equipment controller 26. Radio equipment controller 26 then processes the received signal and the mobile traffic is routed as required to a destination mobile subscriber, typically through a core network (not shown) connected to the base station hub 30 via the edge routers 71.

The invention claimed is:

1. A method of controlling a base station system, the method comprising:
   generating and transmitting a first control signal to cause a first radio equipment controller to control, at a first time, a first radio equipment in an active state, the first radio equipment associated with a first antenna having a first coverage area in a first regional zone; and
   generating and transmitting at least one additional control signal to cause the first radio equipment controller, at a later time, to switch the first radio equipment from the active state to an inactive state and control a second radio equipment associated with a second antenna having a second coverage area in a second regional zone instead of the first radio equipment, the first radio equipment controller controlling any one of the first radio equipment in the first regional zone and the second radio equipment in the second regional zone at any time.

2. A method according to claim 1, further comprising: selecting the second radio equipment from a plurality of radio equipment in the second regional zone.

3. A method according to claim 2, wherein the step of selecting the second radio equipment from the plurality of radio equipment comprises:
   selecting the second radio equipment from the plurality of radio equipment based on existing mobile user traffic load in at least one of the respective coverage areas of the plurality of radio equipment in the second regional zone.

4. A method according to claim 3, wherein the step of selecting the second radio equipment from the plurality of radio equipment comprises:
selecting the second radio equipment from the plurality of radio equipment based on existing mobile user traffic load in each of the respective coverage areas of the plurality of radio equipment in the second regional zone.

5. A method according to claim 2, wherein the step of selecting the second radio equipment from the plurality of radio equipment comprises:
selecting the second radio equipment from the plurality of radio equipment based on an indication of expected mobile user traffic load in at least one or the respective coverage areas of the plurality of radio equipment in the second regional zone.

6. A method according to claim 3, wherein the step of selecting the second radio equipment from the plurality of radio equipment comprises:
receiving an indication of existing mobile user traffic load in at least one of the respective coverage areas of the plurality of radio equipment in the second regional zone; and
selecting the second radio equipment from the plurality of radio equipment based on the indication.

7. A method according to claim 1, wherein:
the at least one additional control signal causes the second radio equipment to switch from the inactive state to the active state,
the inactive state comprises a power-down state, and
the active state comprises a power-up state.

8. A method according to claim 1, further comprising:
determining that one or more further radio equipment in the first regional zone are able to serve existing mobile users of the first radio equipment in the first regional zone, the one or more further radio equipment being associated with one or more additional antenna with a combined coverage area overlapping the first coverage area of the first antenna associated with the first radio equipment; and
generating and transmitting the control signal arranged to cause the first radio equipment controller to control the second radio equipment instead of the first radio equipment.

9. A method according to claim 8, wherein the step of determining that the one or more further radio equipment in the first regional zone are able to serve existing mobile users of the first radio equipment in the first regional zone comprises:
determining that the one or more further radio equipment are able to meet a quality of service associated with each of the existing mobile users of the first radio equipment.

10. A non-transitory computer-readable medium storing instructions which, when executed by a computer, cause the computer to perform the method of claim 1.

11. An apparatus comprising:
a radio equipment controller; and
a controller in communication with the radio equipment controller, the controller configured to:
generate and transmit a first control signal arranged to cause the radio equipment controller to control, at a first time, a first radio equipment in an active state, the first radio equipment associated with a first antenna having a first coverage area in a first regional zone, and
generate and transmit at least one additional control signal to cause the radio equipment controller, at a later time, to switch the first radio equipment from the active state to an inactive state and control a second radio equipment associated with a second antenna having a second coverage area in a second regional zone instead of the first radio equipment, the first radio equipment controller controlling any one of the first radio equipment in the first regional zone and the second radio equipment in the second regional zone at any time.

12. An apparatus according to claim 11, wherein the controller is further configured to select the second radio equipment from a plurality of radio equipment in the second regional zone.

13. An apparatus according to claim 12, wherein the controller is configured to select the second radio equipment from the plurality of radio equipment based on expected and/or existing mobile user traffic load in at least one of the respective coverage areas of the plurality of radio equipment in the second regional zone.

14. An apparatus according to claim 11, wherein:
the at least one additional control signal causes the second radio equipment to switch from the inactive state to the active state,
the inactive state comprises a power-down state, and
the active state comprises a power-up state.

15. An apparatus according to claim 11, further comprising a processor configured to:
determine that one or more further radio equipment in the first regional zone are able to serve existing mobile users of the first radio equipment in the first regional zone, the one or more further radio equipment being associated with one or more additional antenna with a combined coverage area overlapping the first coverage area of the first antenna associated with the first radio equipment; and
cause the controller to generate and transmit the control signal arranged to cause the first radio equipment controller to control the second radio equipment in the second regional zone instead of the first radio equipment in the first regional zone.

16. A base station system comprising:
a plurality of radio equipment, wherein each of the plurality of radio equipment is coupled to a respective antenna having a respective coverage area;
a radio equipment controller; and
a controller in communication with the radio equipment controller, the controller operable to:
generate and transmit a first control signal to cause the radio equipment controller to control, at a first time, a first radio equipment in an active state, the first radio equipment associated with a first antenna having a first coverage area in a first regional zone; and
generate and transmit at least one additional control signal to cause the radio equipment controller, at a later time, to switch the first radio equipment from the active state to an inactive state and control a second radio equipment associated with a second antenna having a second coverage area in a second regional zone instead of the first radio equipment, the radio equipment controller controlling any one of the first radio equipment in the first regional zone and the second radio equipment in the second regional zone at any time.

17. A base station system according to claim 16, wherein the radio equipment controller is configured to communicate with each of the plurality of radio equipment by a wavelength-switch optical network.

18. A method according to claim 1, wherein the at least one additional control signal causes the radio equipment controller to:
- tear down a first path through a wavelength-switch optical network between the radio equipment controller and the first radio equipment in the first regional zone; and
- cause a second path to be setup through the wavelength-switch optical network between the radio equipment controller and the second radio equipment in the second regional zone.

19. An apparatus according to claim 11, wherein the at least one additional control signal causes the radio equipment controller to:
- tear down a first path through a wavelength-switch optical network between the radio equipment controller and the first radio equipment in the first regional zone; and
- cause a second path to be setup through the wavelength-switch optical network between the radio equipment controller and the second radio equipment in the second regional zone.

20. The method of claim 16, wherein the at least one additional control signal causes the radio equipment controller to:
- tear down a first path through the wavelength-switch optical network between the radio equipment controller and the first radio equipment in the first regional zone; and
- cause a second path to be setup through the wavelength-switch optical network between the radio equipment controller and the second radio equipment in the second regional zone.

* * * * *